April 28, 1970 D. A. MEIER 3,509,550

NDRO THIN FILM MEMORY

Filed Nov. 14, 1966 5 Sheets-Sheet 1

INVENTOR
DONAL A. MEIER

BY Louis A. Kline
John J. Matlago
Nathan Cass
HIS ATTORNEYS

NDRO THIN FILM MEMORY

Filed Nov. 14, 1966

INVENTOR
DONAL A. MEIER

BY Louis A Kline
John J. Maclago
Nathan Cass
HIS ATTORNEYS

INVENTOR
DONAL A. MEIER

BY Louis A. Kline
John J. Matlago
Nathan Cass
HIS ATTORNEYS

April 28, 1970 D. A. MEIER 3,509,550

NDRO THIN FILM MEMORY

Filed Nov. 14, 1966 5 Sheets-Sheet 4

INVENTOR
DONAL A. MEIER

BY Louis A Kline
John J. Matlago
Nathan Cass
HIS ATTORNEYS

April 28, 1970 D. A. MEIER 3,509,550

NDRO THIN FILM MEMORY

Filed Nov. 14, 1966 5 Sheets-Sheet 5

INVENTOR
DONAL A. MEIER

BY Louis A. Kline
John J. Maclago
Nathan Cass
HIS ATTORNEYS

United States Patent Office 3,509,550

Patented Apr. 28, 1970

3,509,550
NDRO THIN FILM MEMORY

Donal A. Meier, Inglewood, Calif., assignor to The National Cash Register Company, Dayton, Ohio, a corporation of Maryland Filed Nov. 14, 1966, Ser. No. 594,089
Int. Cl. G11c *11/04, 7/00*
U.S. Cl. 340—174 6 Claims

ABSTRACT OF THE DISCLOSURE

A magnetic memory system having a plurality of bistable thin film magnetic rod elements, each switchable from one bistable state to the other along the axis thereof. The reading means for the system provides for applying an axial non-destructive magnetic field to selected ones of the rod elements and sensing means for detecting the states of the selected elements based on their response to the axial non-destructive magnetic field. The writing means for the system provides for applying a bipolar multi-pulse magnetic field in the axial direction to selected elements, and concurrently applying a substantially constant axial magnetic field in either of two opposite directions to said selected elements. The amplitude of the bipolar multi-pulse magnetic field and the constant magnetic field is chosen so that neither by itself is sufficient to change the state of an element. However, when the axial fields coincide on a selected element that is residing in a state opposite to the resultant axial switching direction of the coincident magnetic fields, the selected element is switched from one bistable state to the other in a plurality of discrete steps, one step for each switching pulse of the resultant applied axial magnetic field.

The present invention relates generally to digital computer memory systems, and more particularly to an improved magnetic memory arrangement and construction.

With the ever increasing use of digital computers, considerable expenditure and effort have been directed towards providing improved memories for use therewith. It is the broad object of the present invention to further advance the state of the art of such memory systems.

A more specific object of the invention is to provide an improved NDRO memory capable of economical organization, non-critical performance, and high speed operation.

Another object of the invention in accordance with one or more of the foregoing objects is to provide an improved memory incorporating thin film rod elements operating in substantially an axial mode.

Briefly, the above objects are accomplished in accordance with a preferred embodiment of the invention, which comprises a three-dimensional thin film rod memory system constructed and arranged in a highly economical and non-critical organization made possible by employing nondestructive read out in conjunction with a novel writing technique, whereby the state of a selected rod element is switched in a plurality of discrete steps so as to reduce disturbance effects on unselected elements.

The specific nature of the invention as well as other objects, uses and advantages thereof will become apparent from the following description of an exemplary embodiment of the invention taken in conjunction with the accompanying drawings in which.

Like numerals designate like elements throughout the figures of the drawings.

Figure 1:
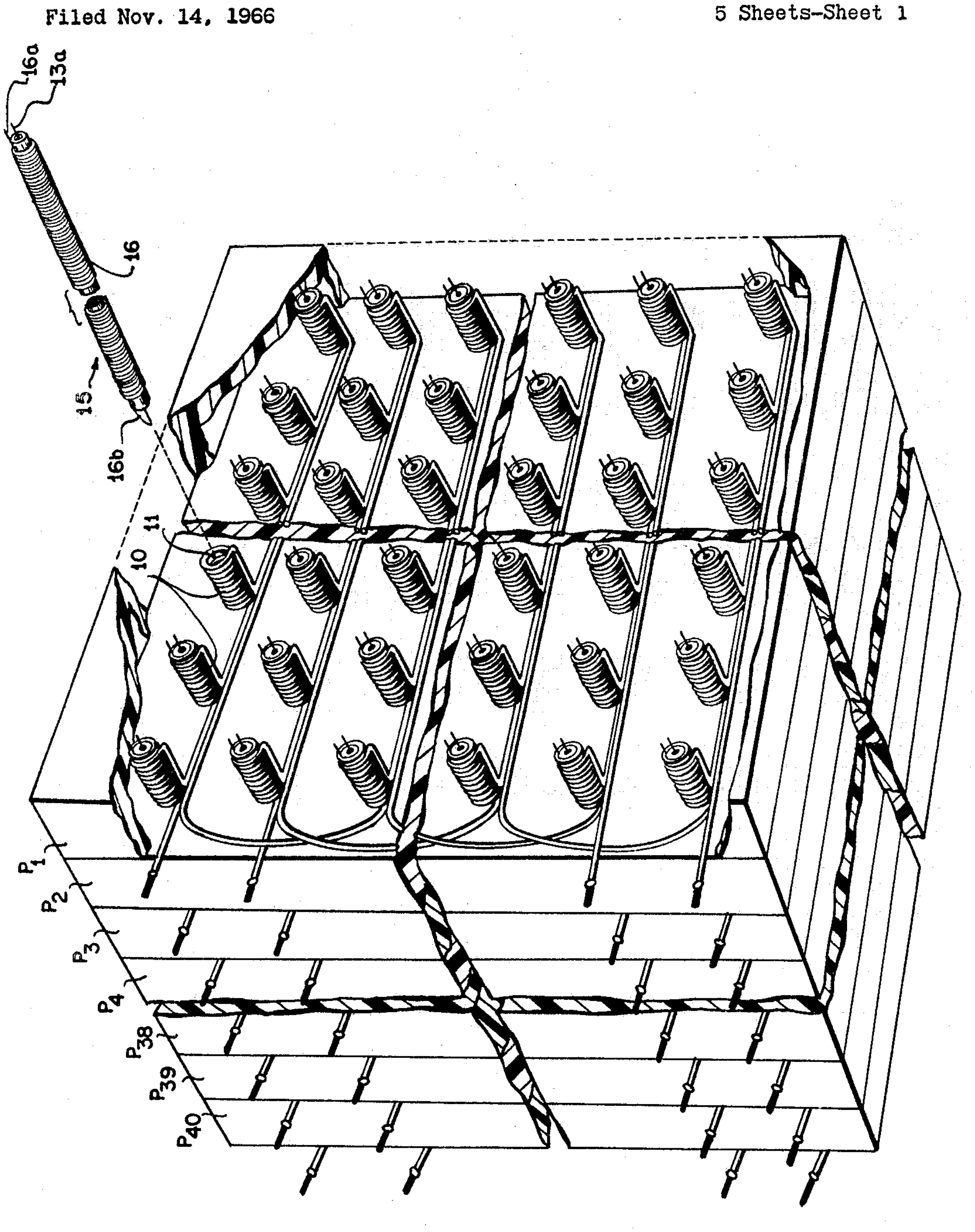
FIG. 1 is a overall perspective view of a thin film magnetic rod memory used in the preferred embodiment of the invention described herein, a single typical rod structure being shown external to the memory in a position ready for insertion.

Referring initially to FIG. 1, illustrated therein is an exemplary magnetic thin film rod memory matrix of the same general type as disclosed in copending patent application Ser. No. 560,478, filed June 27, 1966, and which is employed in the preferred embodiment of the present invention to be described herein.

The exemplary matrix of FIG. 1 typically comprises a plurality of forty stacked planes or plates $P_1$–$P_{40}$ containing solenoid windings 10 secured in aligned fashion in the planes so as to form a row-column array of windings in each plane, with respectively located windings in different planes aligned so as to provide a continuous bore 11 therethrough, and with rod structures 15 inserted through these aligned bores.

Each of the planes $P_1$–$P_{40}$ may comprise, for example, a 65 x 16 array of windings which, in the preferred embodiment being considered herein, are designated digit-sense windings. Each digit-sense winding is formed of a solenoid winding 10 with a cylindrical bore 11 provided therein of a diameter preferably just sufficient to permit a respective thin film rod structure 15 and its associated solenoid winding 16 to be passed therethrough. The solenoid winding 16 is wound on the rod prior to insertion into the matrix, and, in the preferred embodiment of the invention being described herein, serves as a word winding.

Figure 2:
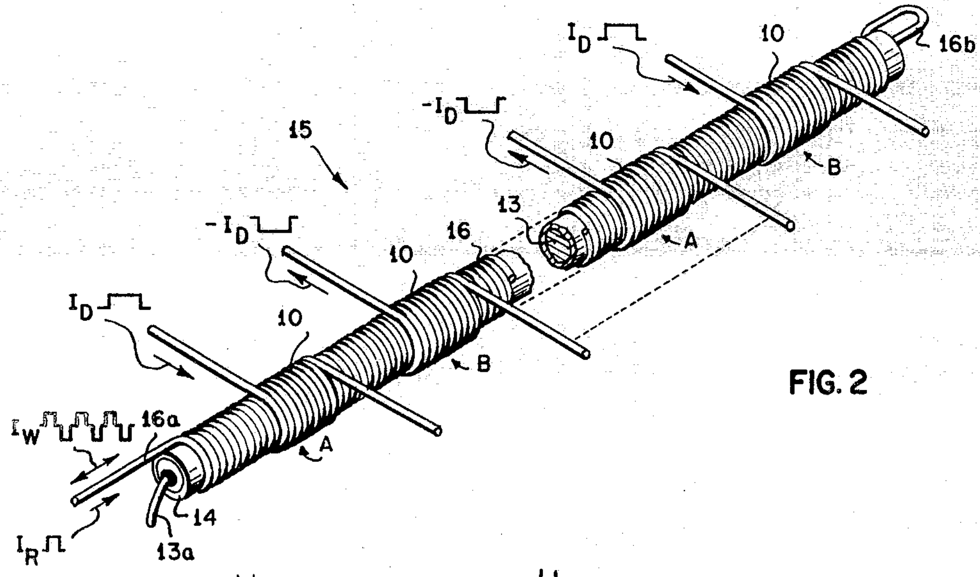
FIG. 2 (on the same sheet as FIGS. 6–8) is a fragmentary perspective enlarged view of a rod structure and its associated windings when inserted in the memory of FIG. 1.

FIG. 2 (on the same sheet as FIG. 6–8) illustrates an enlarged fragmentary view of a typical rod structure 15 along with typical digit-sense windings 10 associated therewith when the rod structure 15 is inserted into its respective aligned bores 11 in the matrix of FIG. 1. Each rod structure 15 preferably comprises a long thin rod-like conductive substrate 13 of beryllium copper having a diameter of about 3 to 50 mils, and on which is electrodeposited a magnetic thin film 14 of 500 to 10,000 angstroms comprising approximately 97% iron and 3% nickel, or a bilayer of the type disclosed in Patent No. 3,213,431, or other suitable composition.

Still referring to FIG. 2, it will be understood that the end 16*b* of the word winding 16 nearest the back of the rod structure (as view in FIG. 2) is soldered to the back end of the conductive substrate 13, thereby connecting the word winding 16 and the substrate 13 of each rod structure 15 in series. A lead wire 13*a* is soldered to the front end of the substrate 13, and, along with the unsoldered end 16*a* of the word winding 16, these serve as the input terminals for the rod structure 15. The soldering is preferably accomplished using the technique disclosed in the commonly assigned copending patent application Ser. No. 492,496, filed Oct. 4, 1965, in which a very thin gold or silver overcoating is provided over the ends of the rod to facilitate soldering to the substrate.

The manner in which writing and non-destructive read out of data may be achieved in accordance with the invention will next be described. It will be understood with reference to FIG. 2 that each bistable magnetic element of the memory is constituted by the portion of the magnetic thin film in the immediate vicinity of a respective digit-sense solenoid winding 10. Since, as illustrated in FIG. 1, there are forty planes $P_1$–$P_{40}$ of digit-sense windings in the embodiment being described herein, each rod structure 15 provides forty magnetic storage elements along its length.

The organization of the memory being described herein is what is conventionally known as a two element per digit organization, in which two magnetic elements are used to constitute one binary digit. The two magnetic elements representing each digit are preferably chosen as adjacent portions "A" and "B" (FIG. 2) on the same rod. Such a choice is highly advantageous, since these two adjacent portions can be expected to have very similar magnetic properties as a result of the fact that a rod can be fabricated under continuous, automatic procedures which produce highly uniform thin film coatings, particularly on the same rod, and most particularly on adjacent portions on the same rod. A typical manner in which such automatic fabrication can be provided is described in the article "The Magnetic Rod—A Cylindrical, Thin-Film Memory Element" by D. A. Meier and A. J. Kolk, published on pages 195–212 in the book "Large-Capacity Memory Techniques for Computing Systems," edited by Marshall C. Yovits, The MacMillan Company, New York, 1962.

The manner in which each pair of adjacent magnetic elements A and B on a rod structure 15 (FIG. 2) may be operated for writing and non-destructive read out in accordance with the invention will now be considered with additional reference to the graphs of FIGS. 3–8.

Figure 3:
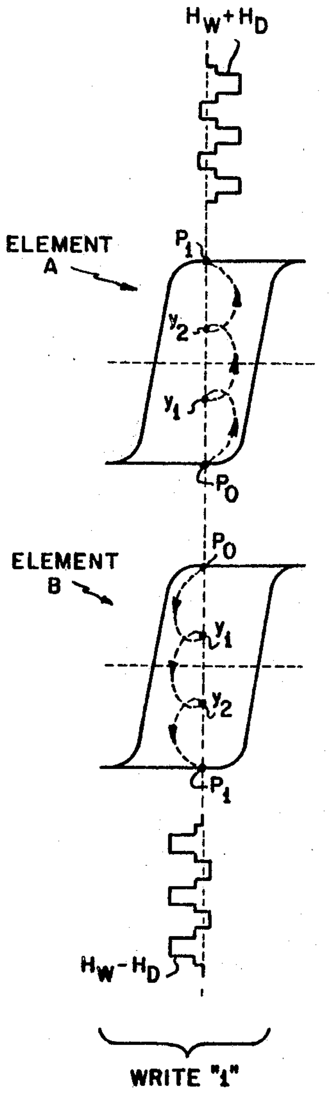
FIGS. 3–5 are graphs illustrating how writing is typically accomplished in accordance with the invention.
Figure 4:
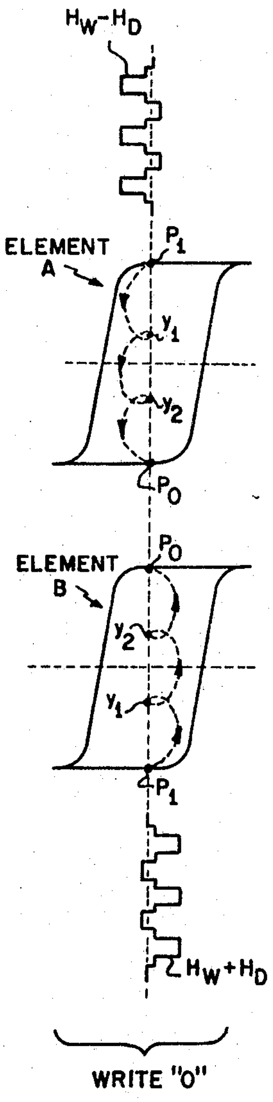
Figure 5:
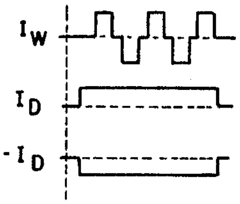

The writing operation is illustrated in FIGS. 3–5 and will be described first. FIG. 3 illustrates the condition where magnetic elements A and B of a typical pair both initially reside at point $P_0$ on their respective hysteresis loops, representing a "0" binary digit, and FIG. 4 illustrates the condition where magnetic elements A and B of a typical pair both initially reside at point $P_1$ on their respective hysteresis loops, representing a "1" binary digit. For the purpose of this description, it will first be assumed that elements A and B both initially reside in the "0" binary digit condition (i.e., both at $P_0$), as shown in FIG. 3, and that as a result of the writing operation to be described, the elements will have their present "0" binary digit condition changed to a "1" binary digit condition (both at $P_1$) in three discrete steps by appropriate coincidence of word and digit currents $I_W$ and $I_D$ (FIG. 5).

Thus, considering the writing operation in detail, it will be assumed that the word winding 16 of the rod structure 15 shown in FIG. 2 is selected to receive a multi-pulse bipolar word write current $I_W$, via its input terminals 13*a* and 16*a*, and that the pair of elements A and B under consideration are those at the front end of the rod structure. The multi-pulse bipolar word write current $I_W$ has the waveform illustrated in FIG. 5, and may typically comprise three positive pulses alternating with three negative pulses. More or less pulses may be used depending on the particular characteristics of the memory.

Concurrently with the application of the word write current $I_W$, a positive digit current $I_D$ (FIGS. 2 and 5) is applied to the digit-sense winding 10 of element A, and a negative digit current $-I_D$ (FIGS. 2 and 5) is applied to the digit-sense winding of element B. The resultant magnetic fields $H_W+H_D$ and $H_W-H_D$ respectively applied to elements A and B are illustrated in FIG. 3 above and below their respective hysteresis loops. It will be understood from FIG. 3 that elements A and B are each thereby caused to step from $P_0$ to $P_1$ in three steps $$(P_0 \rightarrow y_1 \rightarrow y_2 \rightarrow P_1)$$

both elements ending up at $P_1$, which is the desired binary digit "1" condition. The peak amplitudes of the word write current $I_W$ and the digit current $I_D$ are chosen so that, acting alone, neither is sufficient to disturb the state of a magnetic element, but when coincident on a magnetic element, they produce a resultant applied magnetic field sufficient to cause the step-by-step switching illustrated in FIGS. 3 and 4. Since switching occurs in a plurality of discrete steps, the word write and digit currents can be made of much smaller amplitude than would otherwise be possible, thereby reducing disturbance effects on unselected elements.

Now turning to FIG. 4, illustrated therein is the situation where both elements A and B of a pair are initially at $P_1$, representing a "1" binary digit condition. It will be assumed that the pair of elements A and B at the rear end of the rod structure 15 in FIG. 2 are in the condition shown in FIG. 4. To write a "0" in these elements, the multi-pulse word write current $I_W$ (FIG. 5) is applied to the word winding 16 and, concurrently therewith, a digit current $-I_D$ is applied to element A and a digit current $I_D$ is applied to element B. As shown in FIG. 4, a resultant magnetic field $H_W-H_D$ is thereby applied to the digit-sense winding of element A and a resultant magnetic field of $H_W+H_D$ to the digit-sense winding of element B, causing each element to switch from $P_1$ to $P_0$ in three steps $(P_1 \rightarrow y_1 \rightarrow y_2 \rightarrow P_0)$, resulting in a "0" binary digit condition.

It will be understood from FIGS. 3 and 4 that if the applied digit signals were in the reverse direction from that shown, so as to attempt to write a "0" in a pair of elements initially in the "0" binary digit condition, or a "1" in a pair of elements initially in the "1" binary digit condition, or if no digit current at all were applied along with the write current $I_W$ to the elements of a pair, then the resultant applied fields would merely cause each element to shuttle around its initial position ($P_0$ or $P_1$, as the case may be) without any change in state occurring. Each pair of elements would then end up in the same binary digit condition as before after the writing operation is concluded.

Figure 6:
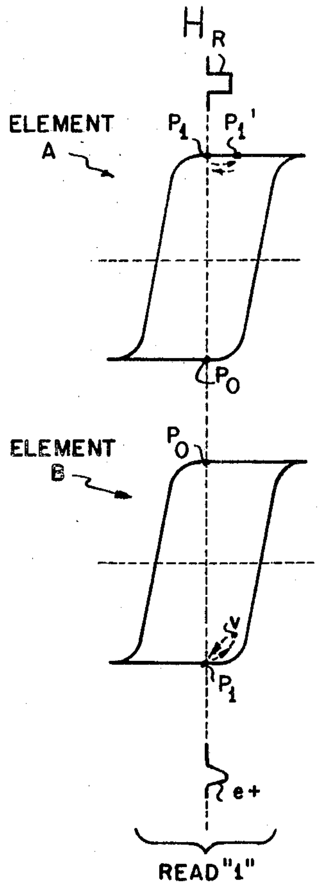
FIGS. 6–8 (on the same sheet as FIG. 2) are graphs illustrating how reading is typically accomplished in accordance with the invention.
Figure 7:
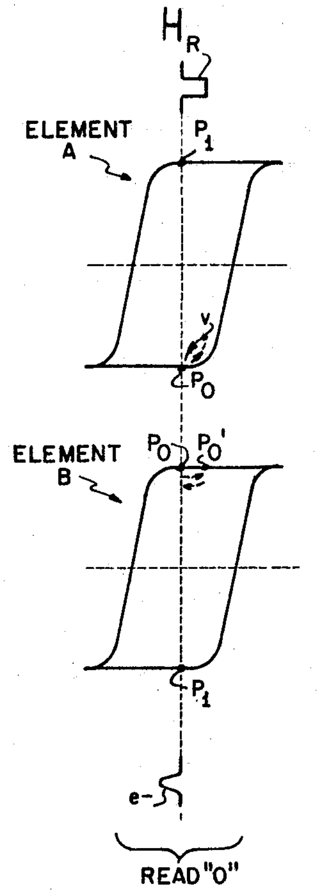
Figure 8:

Having described how a binary "1" or "0" is written in a pair of magnetic elements A and B, it will next be described with reference to FIGS. 6–8 along with FIG. 2, how non-destructive read out of a stored binary digit is accomplished. To obtain non-destructive read out, a read current pulse $I_R$ (FIG. 8) is applied to the word winding 16 (FIG. 2) of the selected rod structure, causing a magnetic field $H_R$ (FIGS. 6 and 7) to be applied to each magnetic element of that rod. The read current pulse $I_R$ is chosen so that when applied to an element in a switching direction (as for element B in FIG. 6 and element A in FIG. 7), the element will only momentarily be switched out of its stored state, and will automatically return thereto when the read current pulse $I_R$ is removed $(P_0 \rightarrow v \rightarrow P_0$ or $P_1 \rightarrow v \rightarrow P_1)$. When the read current pulse $I_R$ is applied to an element in a non-switching direction (as for element A in FIG. 6 and element B in FIG. 7), the element merely shuttles in a non-switching direction along its hysteresis loop $(P_1 \rightarrow P_1' \rightarrow P_1$ or $P_0 \rightarrow P_0' \rightarrow P_0)$.

As will shortly be described herein, the digit-sense windings 10 of each pair are connected for sensing purposes so that the output signal therefrom during a reading operation is detected as the difference between the signals induced therein during a reading operation, thereby eliminating noise and shuttling effects from the output signal. The digit-sense winding connection arrangement is further chosen so that, when the B element of a pair is the one which momentarily switches $(P_1 \rightarrow v \rightarrow P_1)$, as occurs in FIG. 6, which illustrates a pair of elements in the "1" binary digit condition, then a positive output signal $e+$ is obtained; on the other hand, a negative output signal $e-$ is obtained when element A is the one which switches $(P_0 \rightarrow v \rightarrow P_0)$, as occurs in FIG. 7, which illustrates a pair of elements in the "0" binary digit condition. Thus, detection of the binary data stored in a pair of A and B elements is accomplished by detecting the polarity of the output signal, a positive output signal $e+$ indicating a stored "1," and a negative output signal $e-$ indicating a stored "0."

A significant feature of the preferred embodiment of the present invention being described herein is that the above described non-destructive read out operation using axial mode switching with a thin film rod is primarily based on the difference in incremental permeability between the states of elements A and B, and not on a rotation of the magnetization vector, as is used to obtain a non-destructive capability in some prior art memories. The advantage in the use of such difference in incremental permeability detection is a much less critical non-destructive read operation requiring less critical choice of the thin film magnetic material. When this advantage is taken in conjunction with the non-critical multi-step writing mode, which permits significantly less disturbance of unselected elements, the result is a highly advantageous non-critical memory capable of an economical 2 element per digit organization. A preferred embodiment of such an organization for the memory of FIG. 1 will now be considered in detail.

Figure 9:
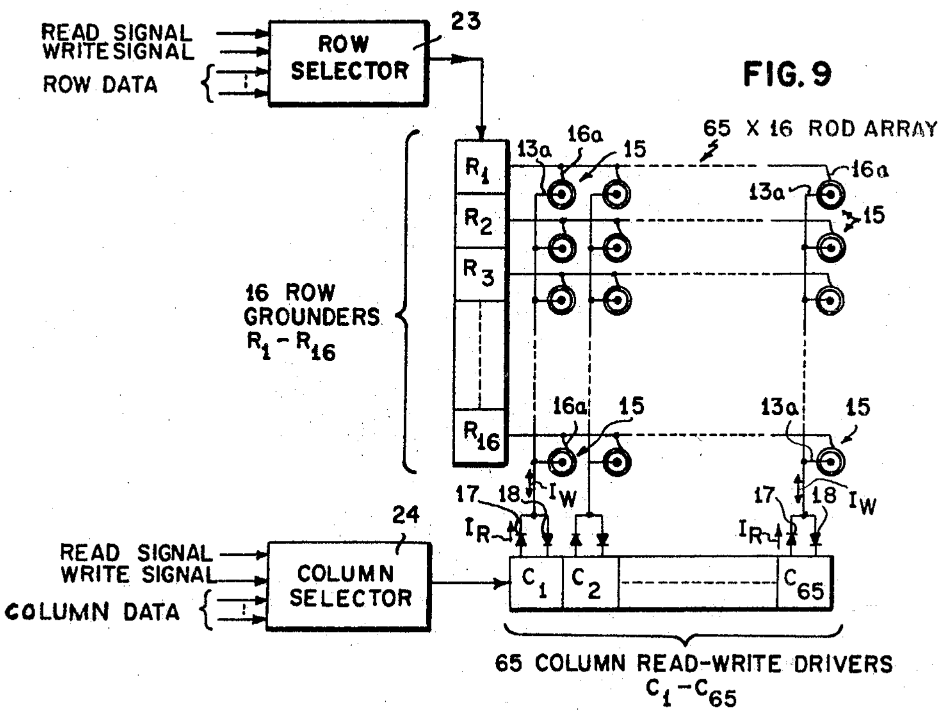
FIG. 9 is a schematic and electrical diagram illustrating how the word windings wound on the rod structures in the memory of FIG. 1 may be connected in a linear selection arrangement.

Considering first the connection and arrangement of the word windings, it will be understood from FIGS. 1, 2 and 9 that the return path for the word winding 16 on each rod structure 15 is advantageously provided by utilizing the conductive substrate 13 to which the back end **16*b* of the word winding 16 (FIGS. 1 and 2) is suitably connected at the back of the rod, such as by soldering. Then, by providing the lead wire 13*a* connected to the substrate 13 at the front of each rod structure, the two leads 13*a* and 16*a*** are available at the front of each rod structure for interconnection in a conventional linear selection word line arrangement, as illustrated in FIG. 9.

It is to be noted that the use of the conductive substrate 13 of each rod structure 15 as a return path, as just described, not only eliminates the need for an additional return path, but also provides a circular or transverse field (which is in addition to the axial field), which reduces the axial switching field required so that a smaller read and write current can be used. But most importantly, the circular or transverse magnetic field produced by current flow in the substrate 13 acts to cancel the external or stray circular magnetic field produced around each rod by the word line and the pitch of the word winding, thereby reducing this type of inter-rod coupling. It may also be noted that inter-rod coupling due to the stray axial field is already greatly reduced, since the cross-sectional area of each rod is so small (of the order of .007 inch diameter) that it will couple very little of the axial field of an adjacent rod.

It will next be explained how the linear selection word line arrangement of FIG. 9 operates to permit the word line of a particular rod structure to be selected for receipt of a read current pulse $I_R$ (FIG. 8) or a multi-pulse bipolar write current $I_W$ (FIG. 5). It will be seen in FIG. 9, that the leads **16*a* from the rod structures in each of the sixteen rows are connected together and to a respective one of the sixteen row grounders $R_1$–$R_{16}$, while the leads 13*a* from the rod structures in each column are connected together and to a respective one of the sixty-five column drivers $C_1$–$C_{65}$ through a respective pair of oppositely poled diodes 17 and 18. Column drivers $C_1$–$C_{65}$ are constructed and arranged to operate in response to a signal 24*a* from a column selector 24 to cause a selected column driver to provide the read current pulse $I_R$, or the multi-pulse bipolar write current $I_W$, in accordance with corresponding signals applied to column selector 24**. Row grounders $R_1$–$R_{16}$ are constructed and arranged to operate during read and write intervals to ground a selected row line, whereby to provide a completed path for the current provided by the selected column driver.

It will be understood that such a connection of windings as shown in FIG. 9 (conventionally referred to as a linear selection arrangement) permits the word winding 16 (FIGS. 1 and 2) of a single predetermined rod structure 15 to be selected to receive a read or write current. This is accomplished by activating the column driver and row grounder which correspond to the row-column coordinates of the rod structure which is to be selected. For example, selection of column driver $C_1$ and row grounder $R_1$ during a reading operation will result in a read current pulse $I_R$ flowing only in the word winding of the rod structure in row 1 and column 1, since only this word winding will have a completed path for the flow of read current from $C_1$ to $R_1$. As is well known with regard to linear selection systems, diodes 17 and 18 are provided for each column driver in order to prevent sneak currents from flowing in unselected lines.

From the foregoing description of FIG. 9, it should now be evident how the read and write currents $I_R$ and $I_W$ required during reading and writing may readily be provided for a selected rod structure. It is merely necessary to design the column drivers and row grounders to be individually selectable (such as by row selector 23 and column selector 24 in FIG. 9) to supply read and write currents $I_R$ and $I_W$ during respective read and write periods in accordance with the row-column coordinates of the selected rod structure.

Figure 10:
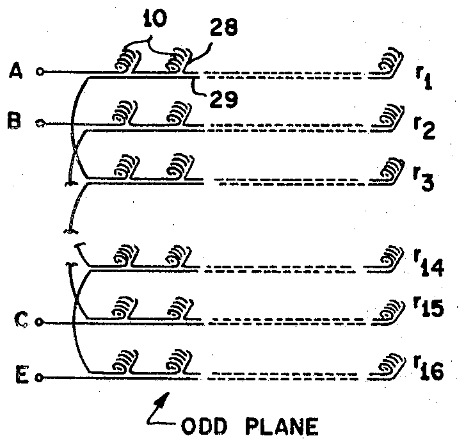
FIGS. 10 and 11 are schematic views illustrating the connection of the digit-sense windings in odd and even planes in the memory of FIG. 1.
Figure 11:
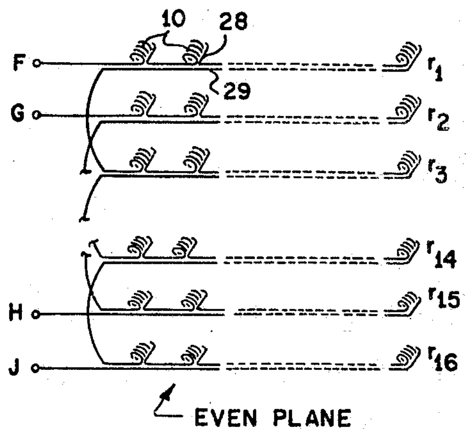
Figure 12:
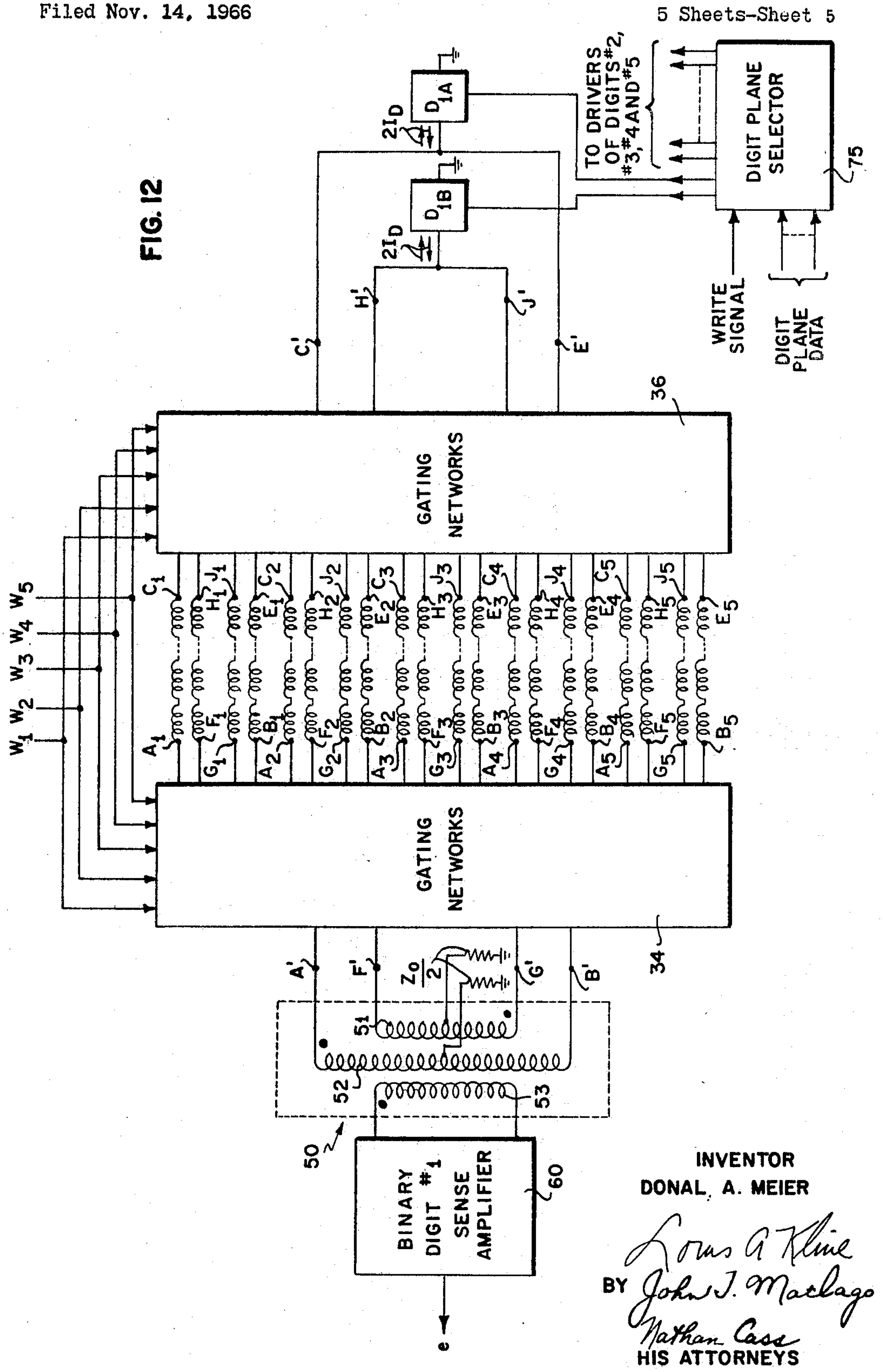
FIG. 12 is an electrical circuit diagram typically illustrating the manner in which the digit #1 planes of digit-sense windings in the memory of FIG. 1 are connected to respective digit driving and sensing means.

Now that the linear selection interconnection arrangement of the rod word windings has been explained, the interconnection arrangement employed for the digit-sense windings will next be considered with reference to FIGS. 10–12. It will be remembered that the digit-sense windings 10 (FIG. 1) perform the digit function during writing, and the sensing function during reading, so that the interconnection arrangement must take this into account. Also, the interconnection arrangement must provide for appropriate noise cancellation which, as will shortly become evident, is provided to an extremely high degree.

Referring to FIGS. 10 and 11, illustrated therein is a preferred digit-sense winding arrangement for odd and even planes in the memory of FIG. 1. Since there are 40 planes $P_1$–$P_{40}$, each rod structure provides 20 pairs of A and B elements for storing 20 binary digits in 2 element per digit fashion along each rod structure. These 20 binary digits are further divided into five 4-digit words, so that each rod structure is capable of storing five 4-digit words.

FIG. 10 shows the winding arrangement for digit-sense solenoids in odd planes $P_1$, $P_3$, $P_5$ . . . $P_{39}$, while FIG. 11 shows the winding arrangement for digit-sense solenoids in even planes $P_2$, $P_4$, $P_6$ . . . $P_{40}$. The memory is organized so that each odd plane of digit-sense windings couples all of the A elements corresponding to the same respective digit of a respective word, and each adjacent even plane of digit-sense windings couples the corresponding B elements of the A elements of the preceding odd plane. For example, plane $P_1$ couples the A elements of the first binary digit of the first word on each rod structure, and plane $P_2$ couples the corresponding B elements of the first binary digit of the first word on each rod structure, each pair of A and B elements being on the same rod structure.

The memory is further organized so that like binary digits of different words are in adjacent planes. For example, the first binary digit of the first, second, third, fourth, and fifth words on each rod structure are in respective pairs of planes $P_1$, $P_2$; $P_3$, $P_4$; $P_5$, $P_6$; $P_7$, $P_8$; and $P_9$, $P_{10}$. Each odd plane of a pair couples A elements and each even plane of a pair couples the corresponding B elements. Similarly, the other three digits of each of the five words on each rod structure are located in a like manner in respective planes $P_{11}$–$P_{20}$ for the second binary digit, planes $P_{21}$–$P_{30}$ for the third binary digit, and planes $P_{31}$–$P_{40}$ for the fourth binary digit.

As indicated in FIGS. 1, 10 and 11, the solenoids in each plane are wound serially in each row, and the return wire for each row (such as indicated at 29 in FIGS. 10 and 11) is looped back along a path adjacent the the solenoid interconnecting wires of the same row. By so doing, circular magnetic fields produced by inter-solenoidal connection wires in each row will be substantially cancelled in a manner similar to that achieved using the conductive substrate 13 as the return path, as was described previously. To provide even further magnetic field cancellation, the return wire for each individual solenoid (indicated by numeral 28 in FIGS. 10 and 11) is perpendicularly returned adjacent and in contact with its respective solenoid so as to approximately cancel out the circular magnetic field produced by the pitch of the solenoid.

Continuing with the description of the digit-sense winding arrangement, it will be seen from FIGS. 10 and 11 that, in each plane, all of the odd rows ($r_1, r_3 \ldots r_{15}$) of digit-sense windings are connected together to form a first series string (across points A and C in FIG. 10 and across points F and H in FIG. 11), and all of the even rows ($r_2, r_4 \ldots r_{16}$) of digit-sense windings are connected together to form a second series string (across points B and E in FIG. 10 and across points G and J in FIG. 11). All odd planes $P_1, P_3 \ldots P_{39}$ are connected in the manner shown in FIG. 10 for a typical odd plane, and all even planes $P_2, P_4 \ldots P_{40}$ are connected in the manner shown in FIG. 11 for a typical even plane. The manner in which these odd and even planes are connected for sensing and digit driving purposes can best be explained by illustrating, with reference to FIG. 12, how sensing and digit driving are accomplished for the first binary digit (digit #1) of each word in the memory, it being understood that the planes corresponding to the other binary digits are connected to respective sensing and digit driving means in the same manner as illustrated in FIG. 12.

Thus, referring to FIG. 12 along with FIGS. 10 and 11, the planes of digit-sense winding strings corresponding to the first digit of each of the five words on each rod structure are illustrated with appropriate point designations A, B, C, E, F, G, H and J corresponding to like-lettered points in FIG. 10, so as to permit each series string of digit-sense windings to be easily identified. The subscripts indicate the particular one of the five words $W_1$, $W_2$, $W_3$, $W_4$ or $W_5$ to which each series string corresponds. That is, series strings $A_1$–$C_1$, $F_1$–$H_1$, $G_1$–$J_1$, and $B_1$–$E_1$ couple the digit #1 A and B elements of the first word on each rod structure, series strings $A_2$–$C_2$, $F_2$–$H_2$, $G_2$–$J_2$ and $B_2$–$E_2$ couple the digit #1 A and B elements of the second word on each rod structure, and so on.

Gating networks 34 and 36 are provided in FIG. 12 to operate during a read-write cycle to connect a particular word set of series strings A–C, F–H, G–J, and B–E to respective A′, C′, F′, H′, G′, J′, B′ and E′ during reading and writing, the particular word set of series strings chosen being determined by which one of signals $W_1$, $W_2$, $W_3$, $W_4$, or $W_5$ is applied to the gating networks 34 and 36. For example, if signal $W_1$ is applied, indicating that digit #1 of the first word is selected, then gating networks 34 and 36 operative to connect points $A_{,1}$ $C_1$, $F_1$, $H_1$, $G_1$, $J_1$, $B_1$ and $E_1$ of the first word set of series strings to respective points A′, C′, F′, H′, G′, J′, B′ and E′.

Considering first the digit #1 sensing means connected to points A′, F′, G′ and B′ in FIG. 12, it will be seen that the sensing means comprises a digit #1 sense amplifier transformer 50 having a first input winding 51 connected across points F′ and G′, a second substantially identical input winding 52 connected across points A′ and B′, and an output winding 53 connected to a digit #1 sense amplifier 60. As is conventional, a "dot" is provided at one end of each transformer winding to indicate the winding polarity. Input windings 51 and 52 are center-tapped and each center tap is connected to circuit ground through an impedance $Zo/2$, where $Zo$ is the characteristic impedance of the respective digit-sense lines connected thereto, such impedance terminations serving to prevent unwanted reflections.

Now considering the digit #1 driving means connected to points C′, H′, J′, and E′ in FIG. 12, it will be seen that bidirectional digit #1 current driver $D_{1A}$ is connected to points C′ and E′, and a bidirectional digit #1 current driver $D_{1B}$ is connected to points H′ and J′, each driver being capable of providing an output current of $2I_D$ in either direction in response to a signal applied thereto by way of a control line from a digit plane selector 75. As indicated, the digit plane selector 75 provides control lines for the other digits #2, #3, #4 and #5, as well as for digit #1. Since the bidirectional digit current $2I_D$ or $-2I_D$ capable of being provided by each digit driver $D_{1A}$ or $D_{1B}$ divides equally between the two series strings to which it flows, the resulting digit current flowing in each series string will be of value $I_D$ or $-I_D$, in accordance with the writing operation previously described in connection with FIGS. 3–5.

With the above description of the memory and its word and digit-sense winding arrangement in view, the overall operation of the memory will now be illustrated by describing an example of typical operation involving selection of the rod structure in row 1 and column 1.

Operation may be considered to be initiated by the appearance of a read signal which is applied to the row selector 23 and the column selector 24 in FIG. 9, along with respective row and column data, to permit selection of the desired row grounder and column driver during the reading operation. Since the rod structure in row 1 and column 1 is the selected one in the present example, the row selector 23 will select row grounder $R_1$, while the column selector 24 will select column driver $C_1$. As a result, a read current pulse $I_R$ will flow from column driver $C_1$, through its respective diode 17, through the word winding 16 (see FIGS. 1, 2 and 9) of the rod structure in column 1 and row 1, and back to circuit ground through row grounder $R_1$. The effect of a read current pulse $I_R$ flowing in the word winding 16 of the selected rod structure is to cause all of the magnetic rod elements thereon to be affected as previously described in connection with FIGS. 6 and 7. For illustrative purposes, the operation of only the digit #1 elements will be considered with reference to FIG. 12, but it will be understood that the elements of each of the other digits operate in a similar manner.

Thus, referring again to FIG. 12, it will be assumed that the first word on the selected row 1, column 1 rod structure is the one from which read out is desired. Accordingly, a $W_1$ signal will be provided during the occurrence of the read current pulse $I_R$, to cause gating networks 34 to electrically connect points $A_1$, $F_1$, $G_1$ and $B_1$ to respective points A′, F′, G′ and B′, and to cause gating networks 36 to electrically connect points $C_1$, $H_1$, $J_1$ and $E_1$ to respective points C′, H′, J′ and E′. As a result, only output signals induced in the digit-sense windings of digit #1 series strings corresponding to the selected first word digit #1 A and B elements from which read out is desired, are able to pass, via the digit #1 sense amplifier transformer 50, to the digit #1 sense amplifier 60 to provide a positive or negative output signal $e$, respectively indicating a "1" or a "0," as previously described in connection with FIGS. 6 and 7. This will be understood by noting that element A of digit #1 of the first word of the rod structure in row 1, column 1 is located in series string A–C of odd plane $P_1$ (FIG. 10), while the corresponding element B is located in series string F–H of even plane $P_2$ (FIG. 11), and that, as shown in FIG. 12, series strings A–C and F–H are applied to the sense amplifier transformer 50 in an opposite polarity sense. Thus, it will be understood from FIGS.

6 and 7, that a sense amplifier output signal $e$ (FIG. 12) of one polarity will be obtained if the digit #1 A and B elements of the first word on the row 1, column 1 rod structure stores a "1," and an opposite polarity output signal if they store a "0." Since series strings A–C and F–H couple rod structures in odd rows (FIGS. 10 and 11), it is evident that a similar output signal relationship occurs for any selected rod structure in an odd row. It is also evident, that a similar output relationship also occurs if the selected rod structure is in an even row, since series strings B–E and G–J coupling respective elements A and B of even row rod structures are likewise connected to the sense ampilfier transformer 50 (FIG. 12) in an opposite polarity sense, so as to also produce similar opposite polarity output signals depending upon whether a "1" or a "0" is stored.

Next to be considered is a typical writing operation using the digit #1 elements as an example of the operation of all digits. Such a writing operation may be initiated by applying a write signal to the row selector 23 and column selector 24 in FIG. 9, along with respective row and column data, to permit selection of the desired row grounder and column driver. Assuming again that the row 1, column 1 rod structure is to be selected during writing, the row selector 23 will select row grounder $R_1$, while the column selector 24 will select column driver $C_1$, causing the multi-pulse bipolar write current shown in FIG. 5 to flow through the word winding 16 (FIG. 2) of the selected row structure in row 1 and column 1.

Since, as previously mentioned in connection with FIGS. 3–5, neither the write current $I_W$ nor the digit current $I_D$ is sufficient by itself to cause writing, it is the coincidence of the two on the selected rod structure, determined by the particular pair of planes selected to receive digit current, which will in effect select the particular one of the five words on the selected rod structure which is to be written into during the writing operation; and, it is the relative directions of the applied digit currents in the selected pair of planes which will determine whether a "1" or a "0" is to be written in accordance with FIGS. 3 and 4. Assuming that writing is desired in the first word on the selected rod structure, then signal $W_1$ will be provided during the writing operation to cause gating networks 34 and 36 in FIG. 12 to operate to electrically connect points $A_1$, $C_1$, $F_1$, $H_1$, $G_1$, $J_1$, $B_1$ and $E_1$ (corresponding to digit #1 of the selected first word) to respective points A′, C′, F′, H′, G′, J′, B′ and E′. Activation of digit #1 drivers $D_{1A}$ and $D_{1B}$ in FIG. 12 is then brought about by applying the same write signal, which was applied to the row selector 23 and column selector 24 in FIG. 9, to the digit plane selector 75 in FIG. 12, along with appropriate digit plane data indicating whether a "1" or a "0" is to be written. If a "1" is to be written, digit plane selector 75 activates driver $D_{1A}$ to cause a positive digit current $I_D$ to flow in each of strings $A_1$–$C_1$ and $B_1$–$E_1$, and activates driver $D_{1B}$ to cause a negative digit current to flow in each of strings $F_1$–$H_1$ and $G_1$–$J_1$, and vice versa, if a "0" is to be written. The other outputs of digit plane selector 75, which are connected to drivers of other digits, cause functioning thereof in a similar manner for their respective planes.

Before leaving consideration of the digit-sense winding connection arrangement, it should be noted that the digit-sense solenoids in each plane are connected in common mode rejection fashion, and in addition, the two adjacent digit-sense solenoids of each digit are connected in an opposite polarity sense. Thus, when the various possible sources of noise in the memory are considered and their effect is traced in the inter-connection arrangement illustrated in FIGS. 10–12, it will become evident that not only is the usual common mode rejection provided, but also, noise which is generated in a digit-sense winding associated with one bistable magnetic element of a selected rod is automatically cancelled out by a substantially equal and opposite noise signal generated in the digit-sense winding associated with the other bistable magnetic element of the same binary digit; the latter cancellation is highly effective since each digit is comprised of adjacent magnetic elements on the same rod structure which, as mentioned previously, have very similar characteristics.

The embodiment disclosed herein is capable of operating speeds of 10 megahertz and greater for a read operation and 2 megahertz and greater for a write operation.

It is to be understood that, since many changes may be made in the construction, arrangement and use of the invention without departing from the scope thereof, the invention is to be considered as including all possible variations and modifications coming within the scope of the invention as defined by the appended claims.

What is claimed is:

1. In a magnetic memory system, a plurality of bistable magnetic elements each residing in one or the other of two bistable states, reading means coupled to said elements for applying a magnetic field to selected ones of said elements, sensing means coupled to said elements for detecting the state of at least one selected one thereof as a result of its response to said magnetic field, and writing means coupled to said elements for applying a plurality of magnetic field pulses to at least a selected one of said elements, said pulses being chosen to switch the selected element from one bistable state to the other in a plurality of discrete steps, one step for each pulse, wherein the magnetic field of said reading means is chosen so as to be insufficient to cause a change of state of an element, wherein each of said magnetic elements is a rod structure comprising a rod-like substrate having a thin magnetic film of thickness of 500 to 10,000 angstroms coated thereon, and wherein said rod-like substrate has a diameter of 3 to 50 mils, wherein first and second pluralities of conductors are inductively coupled to said rod structures, wherein said writing means includes first means coupled to one of said first and second pluralities of conductors for applying a bipolar multi-pulse magnetic field to at least a selected one of said elements, and wherein said writing means also includes second means coupled to the other of said first and second pluralities of conductors for applying a concurrent substantially constant magnetic field to the selected element, the amplitudes of the bipolar multi-pulse magnetic field and the constant magnetic field being chosen so that neither by itself is sufficient to change the state of the selected element, wherein said magnetic fields are applied in a substantially axial direction, and wherein said bistable states constitute different magnetizations in the axial direction, wherein said first and second pluralities of conductors are constructed and arranged in conjunction with said reading and writing means and said sensing means so as to provide a two element per digit organization with the two elements corresponding to each digit being constituted by adjacent elements on the same rod structure, and wherein said sensing means detects the value of a stored digit in a pair of elements by detecting the difference in incremental permeability therebetween.

2. In a magnetic memory system, a plurality of bistable magnetic elements, each of said magnetic elements comprising a rod structure including a rod-like substrate having a diameter of 3 to 50 mils and a thin magnetic film of thickness of 500 to 10,000 angstroms coated thereon, each of said magnetic elements residing in one or the other of two bistable states constituting different magnetizations in the axial direction thereof, reading means coupled to said elements for applying a non-destructive reading magnetic field in an axial direction to a selected plurality of elements constituting a plurality of multi-digit words, sensing means, selection means for coupling said sensing means to the elements corresponding to a selected word of the selected plurality of elements, said sensing means detecting the data stored in the elements of the selected word as a result of the response thereof to said non-destructive reading magnetic field, and writing means including first means for applying a bipolar multi-puse magnetic field in a substantially axial direction to a selected plurality of elements constituting a plurality of multi-digit words and second means for applying a concurrent substantially constant magnetic field in either of two substantially opposite axial directions to the elements corresponding to a selected word of the selected plurality of elements, the amplitudes of the bipolar multi-pulse magnetic field and the constant magnetic field being chosen so that neither by itself is sufficient to change the state of an element but when coincident on a selected element residing in a state opposite to the resultant switching direction of the coincident magnetic fields cause the selected element to switch from one bistable state to the other in a plurality of discrete steps, one step for each switching pulse of the resultant applied magnetic field.

3. In a magnetic memory system, a plurality of bistable magnetic elements each of said magnetic elements comprising a rod structure including a rod-like substrate having a diameter of 3 to 50 mils and a thin magnetic film of thickness of 500 to 10,000 angstroms coated thereon, each of said magnetic elements residing in one or the other of two bistable states constituting different magnetizations in the axial direction, winding means coupled to each element, first means coupled to said elements so as to form a plurality of word lines each of which couples a different plurality of elements constituting a plurality of multi-bit words, second means coupling said elements so as to form a plurality of digit-sense lines each of which couples a plurality of elements on different word lines, reading means coupled to said word lines for applying a non-destructive reading magnetic field in a substantially axial direction to all the elements on a selected word line, sensing means coupled to said digit-sense lines, selection means for connecting said sensing means only to the digit-sense lines corresponding to a particular one of the words on a selected word line, said sensing means detecting the states of the elements of the selected word on the selected word line as a result of the response thereof to said non-destructive reading magnetic field, and writing means including first means coupled to said word lines for applying a bipolar multi-pulse magnetic field in a substantially axial direction to all the elements of a selected word line and second means coupled to said digit-sense lines for applying a concurrent substantially constant magnetic field in either of two substantially opposite axial directions in dependence upon the data to be written into the elements of a selected digit-sense line, the amplitudes of the bipolar multi-pulse magnetic field and the constant magnetic field being chosen so that neither by itself is sufficient to change the state of an element but when coincident on a selected element residing in a state opposite to the resultant switching direction of the coincident magnetic fields cause the selected element to switch from one bistable state to the other in a plurality of discrete steps, one step for each switching pulse of the resultant applied magnetic field.

4. In a magnetic memory system, a plurality of bistable magnetic elements each residing in one or the other of two bistable states, winding means coupled to each element, first means coupled to said element so as to form a plurality of word lines each of which couples a different plurality of elements constituting a plurality of multi-bit words, second means coupling said elements so as to form a plurality of digit-sense lines each of which couples a plurality of elements on different word lines, reading means coupled to said word lines for applying a non-destructive reading magnetic field to all the elements on a selected word line, sensing means coupled to said digit-sense lines, selection means for connecting said sensing means only to the digit-sense lines corresponding to a particular one of the words on a selected word line, said sensing means detecting the states of the elements of the selected word on the selected word line as a result of the response thereof to said non-destructive reading magnetic field, and writing means including first means coupled to said word lines for applying a bipolar multi-pulse magnetic field to all the elements of a selected word line and second means coupled to said digit-sense lines for applying a concurrent substantially constant magnetic field in either of two opposite directions in dependence upon the data to be written to the elements of a selected digit-sense line, the amplitudes of the bipolar multi-pulse magnetic field and the constant magnetic field being chosen so that neither by itself is sufficient to change the state of an element but when coincident on a selected element residing in a state opposite to the resultant switching direction of the coincident magnetic fields cause the selected element to switch from one bistable state to the other in a plurality of discrete steps, one step for each switching pulse of the resultant applied magnetic field, wherein each of said magnetic elements is a rod structure comprising a rod-like substrate having a thin magnetic film of thickness of 500 to 10,000 angstroms coated thereon, and wherein said rod-like substrate has a diameter of 3 to 50 mils, wherein said magnetic fields are applied in a substantially axial direction, and wherein said bistable states constitute different magnetizations in the axial direction, wherein said first and second pluralities of conductors are constructed and arranged in conjunction with said reading and writing means and said sensing means so as to provide a two element per digit organization with the two elements corresponding to each digit being constituted by adjacent elements on the same rod structure, and wherein said sensing means detects the value of a stored digit in a pair of elements by detecting the difference in incremental permeability therebetween.

5. The invention in accordance with claim 4, wherein said digit-sense lines are arranged with respect to said sensing means so as to provide common mode noise rejection.

6. The invention in accordance with claim 4, wherein said substrate is conductive, wherein a solenoid winding is wound along a substantial length of said rod structure, and wherein one end of said solenoid winding is electrically connected to one end of said substrates.

References Cited

UNITED STATES PATENTS

| | | | |
|---|---|---|---|
| 3,102,239 | 8/1963 | Chen et al. | 340—174 XR |
| 3,189,879 | 6/1965 | MacIntyre et al. | 340—174 |
| 3,270,326 | 8/1966 | Schwartz et al. | 340—174 |
| 3,418,644 | 12/1968 | Higashi et al. | 340—174 |

BERNARD KONICK, Primary Examiner

G. M. HOFFMAN, Assistant Examiner